(12) United States Patent
Noh

(10) Patent No.: US 7,200,513 B1
(45) Date of Patent: Apr. 3, 2007

(54) METHOD FOR CLOCKING SPEED USING WIRELESS TERMINAL AND SYSTEM IMPLEMENTING THE SAME

(75) Inventor: Ju-Seok Noh, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 11/372,388

(22) Filed: Mar. 10, 2006

(30) Foreign Application Priority Data

Dec. 14, 2005 (KR) .................. 10-2005-0123476

(51) Int. Cl.
*G01P 11/00* (2006.01)
*G06F 15/00* (2006.01)

(52) U.S. Cl. ..................... 702/142; 702/149
(58) Field of Classification Search ........... 702/142, 702/147, 149, 150; 348/14.08, 14.09, 36; 396/56, 57, 80, 153
See application file for complete search history.

(56) References Cited

U.S. PATENT DOCUMENTS

2003/0026607 A1* 2/2003 Okisu et al. ............... 396/213
2005/0270408 A1* 12/2005 Kwon et al. ............... 348/345

* cited by examiner

*Primary Examiner*—Bryan Bui
(74) *Attorney, Agent, or Firm*—Roylance, Abrams, Berdo & Goodman, LLP

(57) ABSTRACT

A system and method are provided for clocking the speed of a moving object using a wireless terminal in a preview mode of a camera, wherein the method includes the steps of entering a preview mode for speed measurement when a speed measurement function is selected in a camera preview mode of the wireless terminal, measuring a moving distance of an object in the preview mode for speed measurement, measuring a moving time period of the object in the preview mode for speed measurement, and measuring and displaying a moving speed of the object by using the moving distance and moving time period of the object which have been measured. The method can further include steps of measuring a moving time period of the object by receiving image data of a moving object through two camera units in the preview mode for speed measurement, measuring a moving distance of the object through the two camera units in the preview mode for speed measurement, and measuring and displaying a moving speed of the object by using the moving distance and moving time period of the object which have been measured.

16 Claims, 4 Drawing Sheets

METHOD FOR CLOCKING SPEED USING WIRELESS TERMINAL AND SYSTEM IMPLEMENTING THE SAME

CROSS-REFERENCE TO RELATED APPLICATIONS

This application claims the benefit under 35 U.S.C. §119 (a) of Korean Patent Application No. 10-2005-0123476 entitled "Method For Clocking Speed Using Wireless Terminal" filed in the Korean Intellectual Property Office on Dec. 14, 2005, the entire disclosure of which is incorporated herein by reference.

BACKGROUND OF THE INVENTION

1. Field of the Invention

The present invention relates to a method for clocking a speed using a wireless terminal. More particularly, the present invention relates to a method for clocking the speed of a moving object using a wireless terminal in a preview mode of a camera.

2. Description of the Related Art

Recently, wireless terminals have been developed to include high-speed data transmission functions in addition to voice communication functions. The wireless terminals performing such data communication may typically process both packet data and image data.

These wireless terminals include a function for enabling image data to be transmitted and received. Therefore, the wireless terminals can store an image received from a base station and transmit an acquired image to the base station. Such wireless terminals can include a camera for photographing an image and a display unit for displaying an image photographed by the camera. The camera may be comprised of a CCD or CMOS sensor, and the display unit may be comprised of an LCD. In addition, with the miniaturization of camera devices, these camera units have also become miniaturized. When such camera units are incorporated therein, the wireless terminal can photograph an image to be displayed as a moving picture or a still picture, and can transmit a photographed image to the base station.

If, for example, such a wireless terminal having a camera receives the image data of a moving object from the camera and included a function to clock and display the speed of the moving object, it would be possible to easily provide the user with a speed measurement service by using only the wireless terminal, without requiring a separate device for speed measurement.

Accordingly, a need exists for a system and method for providing a wireless terminal having a camera that can receive image data of a moving object from the camera, and which can further clock and display the speed of the moving object.

SUMMARY OF THE INVENTION

Accordingly, embodiments of the present invention have been made to substantially solve the above-mentioned and other problems occurring in the prior art, and an object of embodiments of the present invention is to provide a method for clocking the speed of a moving object using a wireless terminal in a preview mode of a camera.

To accomplish this and other objects, in accordance with one aspect of embodiments of the present invention, a method is provided for clocking a speed using a wireless terminal comprising a camera unit, the method comprising the steps of entering a preview mode for speed measurement when a speed measurement function is selected in a camera preview mode of the wireless terminal, measuring a moving distance of an object in the preview mode for speed measurement, measuring a moving time period of the object in the preview mode for speed measurement, and measuring and displaying a moving speed of the object by using the moving distance and moving time period of the object which have been measured.

In accordance with another aspect of embodiments of the present invention, a method is provided for clocking a speed using a wireless terminal comprising at least two camera units, the method comprising the steps of entering a preview mode for speed measurement when a speed measurement function is selected in a camera preview mode of the wireless terminal, measuring a moving time period of the object by receiving image data of a moving object through the two camera units in the preview mode for speed measurement, measuring a moving distance of the object through the two camera units in the preview mode for speed measurement, and measuring and displaying a moving speed of the object by using the moving distance and moving time period of the object which have been measured.

BRIEF DESCRIPTION OF THE DRAWINGS

The above and other objects, features and advantages of embodiments of the present invention will become more apparent from the following detailed description taken in conjunction with the accompanying drawings, in which.

Throughout the drawings, like reference numerals will be understood to refer to like parts, components and structures.

DETAILED DESCRIPTION OF THE EXEMPLARY EMBODIMENTS

Figure 1:
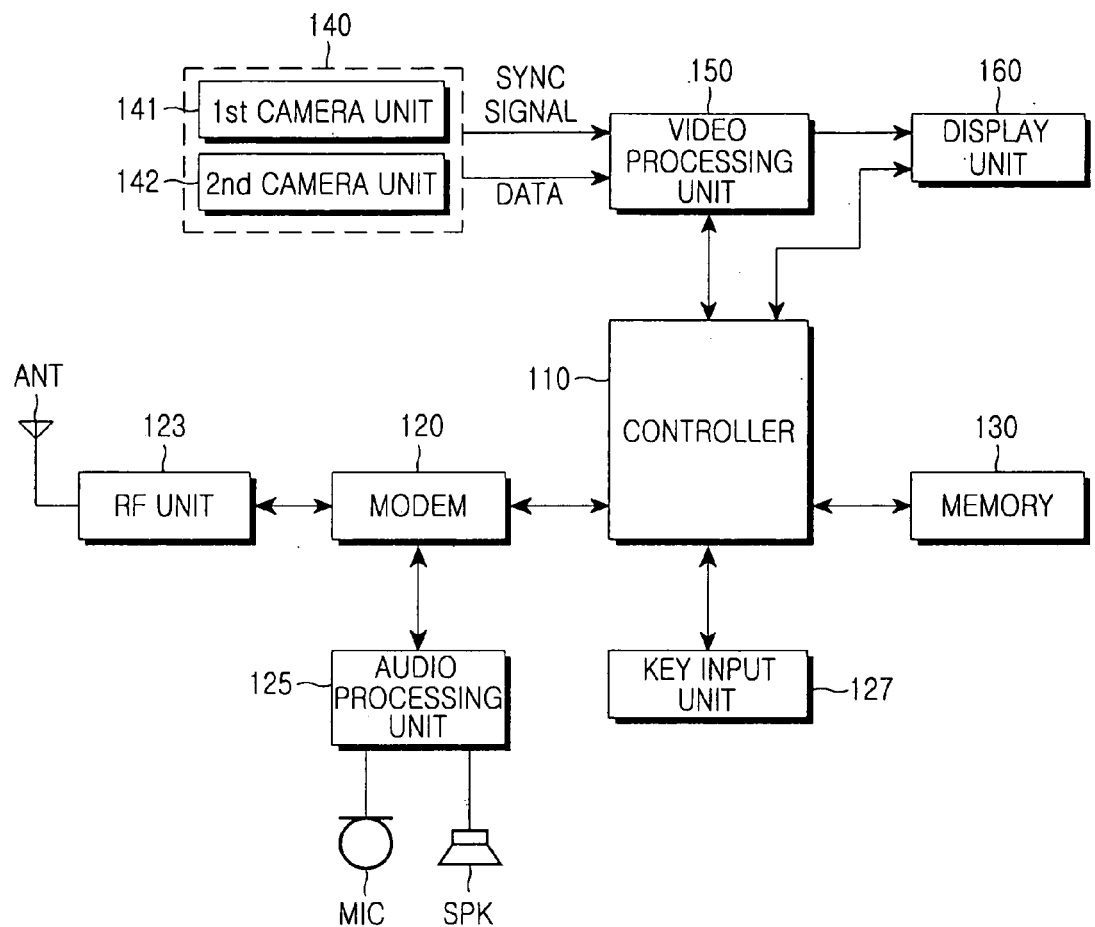
FIG. 1 is a block diagram illustrating a construction of an exemplary wireless terminal according to an embodiment of the present invention.

Hereinafter, exemplary embodiments of the present invention will be described with reference to the accompanying drawings. It is to be noted that the same elements are indicated with the same reference numerals throughout the drawings.

FIG. 1 is a block diagram illustrating the construction of an exemplary wireless terminal having at least two camera units according to an embodiment of the present invention. The wireless terminal comprises a controller 110, a modem 120, a radio frequency (RF) unit 123, an audio processing unit 125, a key input unit 127, a memory unit 130, a camera unit 140, a video processing unit 150, and a display unit 160, but is not limited thereto. The wireless terminal can further comprise at least one of an antenna ANT, a microphone MIC, and a speaker SPK.

The RF unit 123 performs the wireless communication functions of the wireless terminal. The RF unit 123 comprises an RF transmitter and an RF receiver, in which the RF transmitter up-converts and amplifies the frequency of a signal to be transmitted, and the RF receiver low-noise amplifies a received signal and down-converts the frequency of the received signal. The modem 120 comprises a transmitter for encoding and modulating the signal to be transmitted and a receiver for demodulating and decoding the received signal. The audio processing unit 125 may comprise a codec, which itself comprises a data codec for processing packet data and the like, and an audio codec for processing an audio signal such as voice. The audio processing unit 125 converts a digital audio signal received from the modem 120 into an analog signal by means of the audio codec, thereby reproducing the converted analog signal. Also, the audio processing unit 125 converts an analog audio signal for transmission generated from the microphone MIC into a digital audio signal by means of the audio codec, and transmits the converted digital audio signal to the modem 120. The codec may be separately constructed, or may be included in the controller 110.

The memory 130 may comprise a program memory and a data memory. The program memory may store programs for controlling general operations of the wireless terminal and programs for clocking the speed of a moving object in a camera preview mode for speed measurement according to embodiments of the present invention. The data memory temporarily stores data generated while the programs are being executed.

The controller 110 preferably controls the entire operation of the wireless terminal. The controller 110 may comprise the modem 120 and the codec. Also, according to a first embodiment of the present invention, the controller 110 controls one camera unit such that the controller 110 can measure and display the speed of a moving object by using the one camera unit in a camera preview mode for speed measurement. In addition, according to a second embodiment of the present invention, the controller 110 controls two camera units such that the controller 110 can measure and display the speed of a moving object by using the two camera units in a camera preview mode for speed measurement.

The camera unit 140 comprises a first camera unit 141 and a second camera unit 142, which are fixedly installed in the wireless terminal according to an embodiment of the present invention. The camera unit 140 photographs an image, and comprises a camera sensor and a signal processing section. The camera sensor converts an optical signal obtained through the photographing into an electric signal, and the signal processing section converts an analog image signal obtained through the photographing of the camera sensor into digital data. Herein, if it is assumed for example, that the camera sensor is a CCD sensor, the signal processing section may comprise a digital signal processor (DSP). Also, the camera sensor and the signal processing section may be integrally or separately constructed.

The video processing unit 150 performs a function to generate image data for displaying an image signal output from the camera unit 140. The video processing unit 150 processes an image signal, which is output from the camera unit 140, in a frame unit, and outputs the frame image data to be suitable for the screen size and properties of the display unit 160. Also, the video processing unit 150 comprises a video codec so as to compress frame image data displayed on the display unit 160 by using a predetermined scheme and to restore original frame image data from compressed frame image data. Herein, the video codec may comprise a JPEG codec, an MPEG4 codec, a Wavelet codec, and so forth. It is assumed for example, that the video processing unit 150 has an OSD (On Screen Display) function and can output OSD data according to the size of a display screen under the control of the controller 110.

The display unit 160 displays an image signal output from the video processing unit 150 and user data output from the controller 110 on a screen. Herein, the display unit 160 may employ a liquid crystal display (LCD). When the LCD is employed, the display unit 160 may comprise an LCD controller, a memory for storing image data, an LCD display element, and so forth. Herein, when the LCD is realized in a touch screen scheme, the display unit 160 may further serve as an input section. Also, according to embodiments of the present invention, the display unit 160 may display the speed of a clocked object in a preview mode for speed measurement in the wireless terminal.

The key input unit 127 comprises keys for inputting numeral and character information, and function keys for setting various functions. Also, according to embodiments of the present invention, the key input unit 127 may comprise a specific function key for controlling the wireless terminal to clock the speed of an object.

The operation of clocking the speed of a moving object by using the above-mentioned exemplary wireless terminal will now be described in detail with reference to FIGS. 2 to 4.

Figure 2:
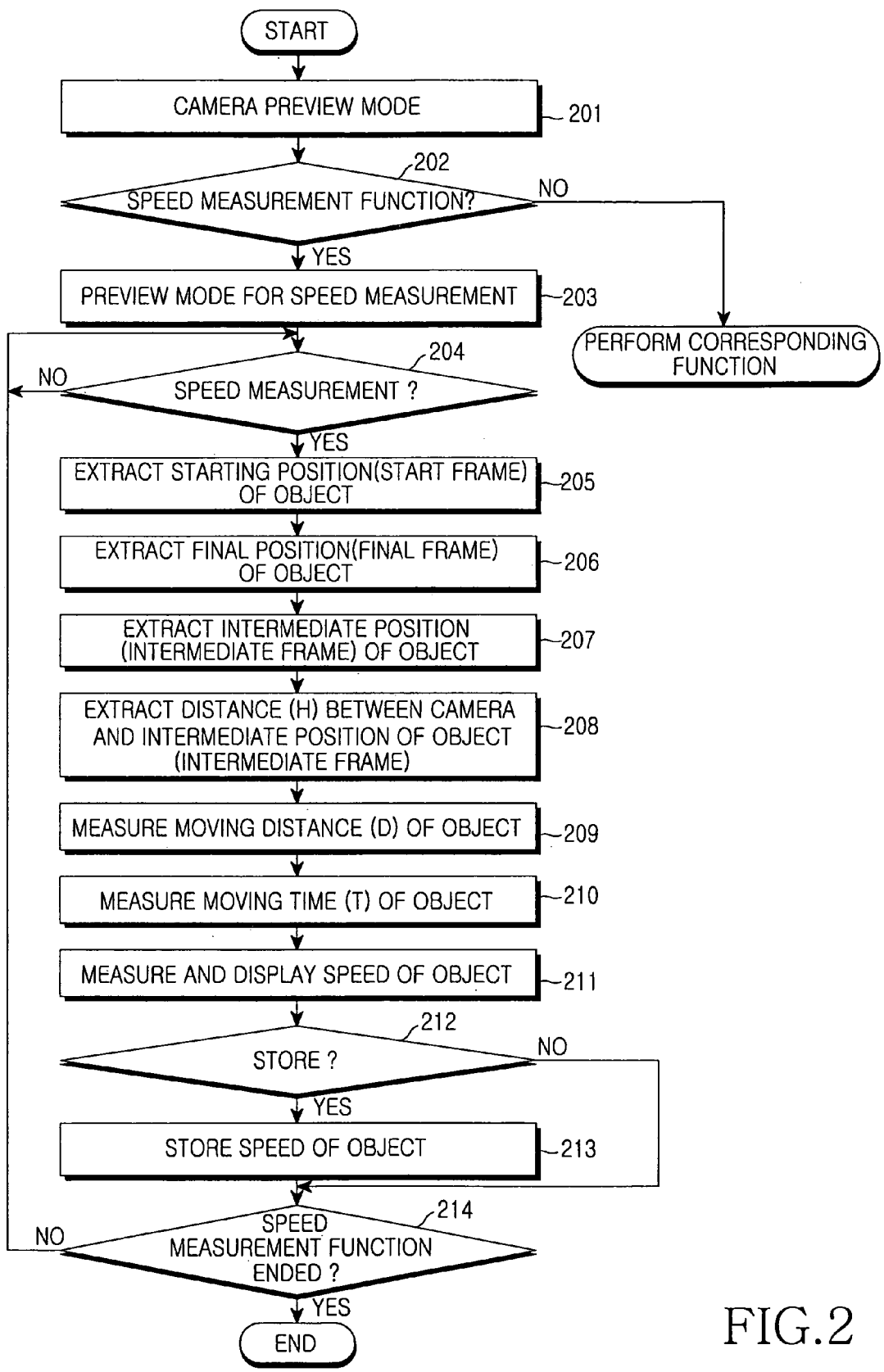
FIG. 2 is a flowchart illustrating an exemplary procedure of clocking the speed of a moving object by using a wireless terminal according to a first embodiment of the present invention.
Figure 3:
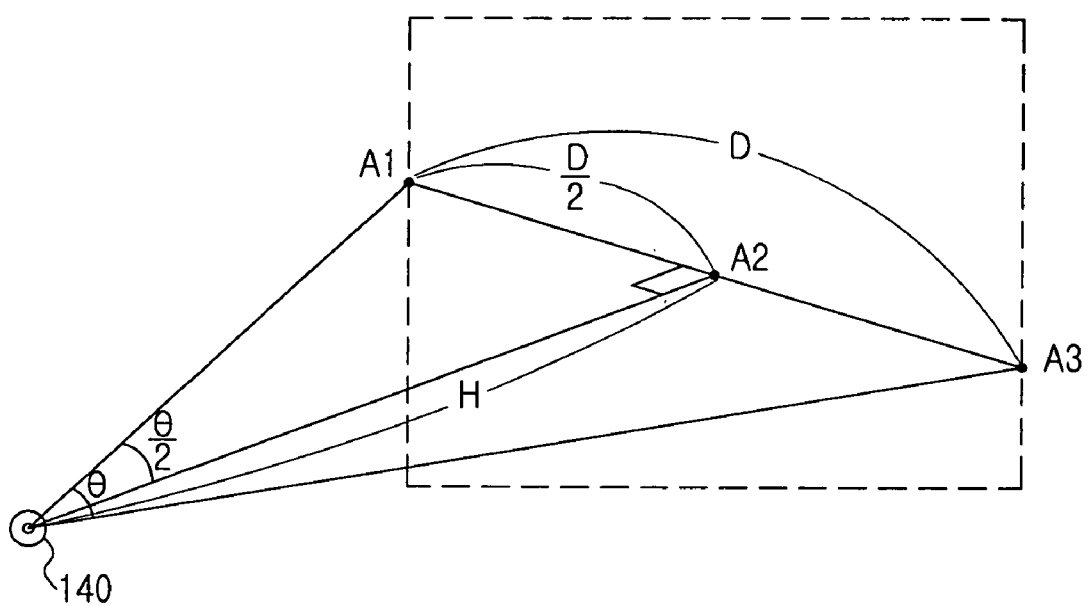
FIG. 3 is a view for illustrating the procedure shown in FIG. 2.

FIG. 2 is a flowchart illustrating an exemplary procedure of clocking the speed of a moving object by using the wireless terminal according to a first embodiment of the present invention, and FIG. 3 is a view for illustrating the procedure shown in FIG. 2. The first embodiment of the present invention will be described with respect to a procedure of clocking the speed of a moving object by using any one of the two camera units 141 and 142 (hereinafter, referred to as "camera unit 140") and displaying the clocked speed.

In the following description, embodiments of the present invention will be described based on the construction of the exemplary wireless terminal shown in FIG. 1.

Referring to FIGS. 2 and 3, when a camera's photographing mode is selected in the wireless terminal, the controller 110 senses it and proceeds to step 201, in which the wireless terminal enters a camera preview mode. In the camera preview mode, the wireless terminal receives image data from the camera unit 140 and displays the received image data. When a speed measurement function is selected in the camera preview mode, the controller 110 senses it in step 202 and proceeds to step 203 for switching the wireless terminal into a preview mode for speed measurement.

Also, the speed measurement function may be selected in a menu of the wireless terminal. In this case, similarly, the controller 110 senses it and may proceed to step 203 for switching the wireless terminal into the preview mode for speed measurement.

When a speed measurement execution is selected in the preview mode for speed measurement, the controller 110 senses it in step 204 and proceeds to step 205 for extracting a starting position of a moving object in the preview mode for speed measurement of the display unit 160.

The controller 110 stores pixel values of image data frames received through the camera unit 140 after the speed measurement execution is selected in step 205, while comparing pixel values of each currently-received image data frame with pixel values of a previously-received image data frame. When it is determined as a result of the comparison that a difference greater than a predetermined value is generated between the pixel values of a currently-received image data frame and the pixel values of a previously-received image data frame, the controller 110 determines that image data of an object, for which speed measurement is desired, is received and performs a control operation so that the currently-received image data frame is extracted as a start frame corresponding to a starting position of the object. In FIG. 3, the starting position of the object is designated by reference mark "A1".

When the start frame corresponding to the starting position of the object is extracted, the controller 110 senses it and proceeds to step 206 for extracting a final position of the moving object in the preview mode for speed measurement of the display unit 160.

The controller 110 stores pixel values of image data frames received through the camera unit 140 after the start frame is extracted in step 206, while comparing pixel values of each currently-received image data frame with pixel values of a previously-received image data frame. When it is determined as a result of the comparison that a difference greater than a predetermined value is generated between the pixel values of a currently-received image data frame and the pixel values of a previously-received image data frame, the controller 110 determines that image data of an object, for which speed measurement is desired, is no longer received and performs a control operation so that the received image data frame is extracted as a final frame corresponding to a final position of the object. In FIG. 3, the final position of the object is designated by reference mark "A3".

When the start frame corresponding to the starting position of the object and the final frame corresponding to the final position of the object are extracted in steps 205 and 206, the controller 110 adds the frame number of the start frame to the frame number of the final frame, and divides the sum by two, thereby extracting the frame number of a frame corresponding to an intermediate position of the object in the display unit 160 in step 207. In FIG. 3, the intermediate position of the object is designated by reference mark "A2".

When the frame corresponding to the intermediate position of the object is extracted in step 207, the controller 110 proceeds to step 208 for extracting a distance between the camera unit 140 and the intermediate position "A2" of the object, that is, distance "H" in FIG. 3.

In step 208, the controller 110 may extract the distance "H" between the camera unit 140 and the intermediate position "A2" of the object by using the auto-focus function of the wireless terminal. The auto-focus function may be performed at the moment when the speed measurement execution is selected in the preview mode for speed measurement. Through the auto-focus function, the controller 110 may store distances between the camera unit 140 and each object included in all image data frames received from the camera unit 140 in the memory 130.

Therefore, the controller 110 may extract the distance "H" between the camera unit 140 and the intermediate position "A2" of the object in step 208, from the distances between the camera unit 140 and each object included in all image data frames, which have been stored in the memory 130.

When the distance "H" between the camera unit 140 and the intermediate position "A2" of the object is extracted in step 208, the controller 110 proceeds to step 209 for calculating a moving distance "D" of the object according to Equation (1) below, $$D = 2H \times \tan\frac{\theta}{2} \quad (1)$$

wherein θ denotes the angle between positions A1 and A3 at the camera unit 140.

After the moving distance "D" of the object is calculated according to Equation (1) in step 209, the controller 110 proceeds to step 210 for calculating a moving time period "T" of the object according to Equation (2) below.

$$T = (\text{Final Frame} - \text{Start Frame}) \times \text{Time Period Per Frame} \quad (2)$$

In Equation (2), the term "Start Frame" represents the frame number of the start frame corresponding to the starting position "A1" of the object, and the start frame number of the object extracted in step 205 is substituted for the "Start Frame". Also, the term "Final Frame" represents the frame number of the final frame corresponding to the final position "A3" of the object, and the final frame number of the object extracted in step 206 is substituted for the "Final Frame". In addition, the term "time Period Per Frame" represents a time period required for receiving one frame through the camera unit 140. The time period required for receiving one frame may be calculated by using the number of received frames per second.

After the moving distance "D" and the moving time period "T" of the object are calculated according to Equations (1) and (2) in steps 209 and 210, the controller 110 proceeds to step 211 in which the speed of the object is calculated according to Equation (3) below, and the calculated speed is displayed.

$$\text{Speed} = \frac{\text{Moving Distance } (D)}{\text{Moving Time } (T)} \quad (3)$$

When a storing function is selected in step 211 when displaying the calculated speed of the object, the controller 110 senses it in step 212 and proceeds to step 213 for storing the displayed speed of the object. When the speed measurement function is ended, the controller 110 senses it in step 214 and performs a control operation such that the preview mode for speed measurement is ended. When the preview mode for speed measurement is ended, the wireless terminal may be switched either into the camera preview mode of step 201 or into a waiting mode.

Figure 4:
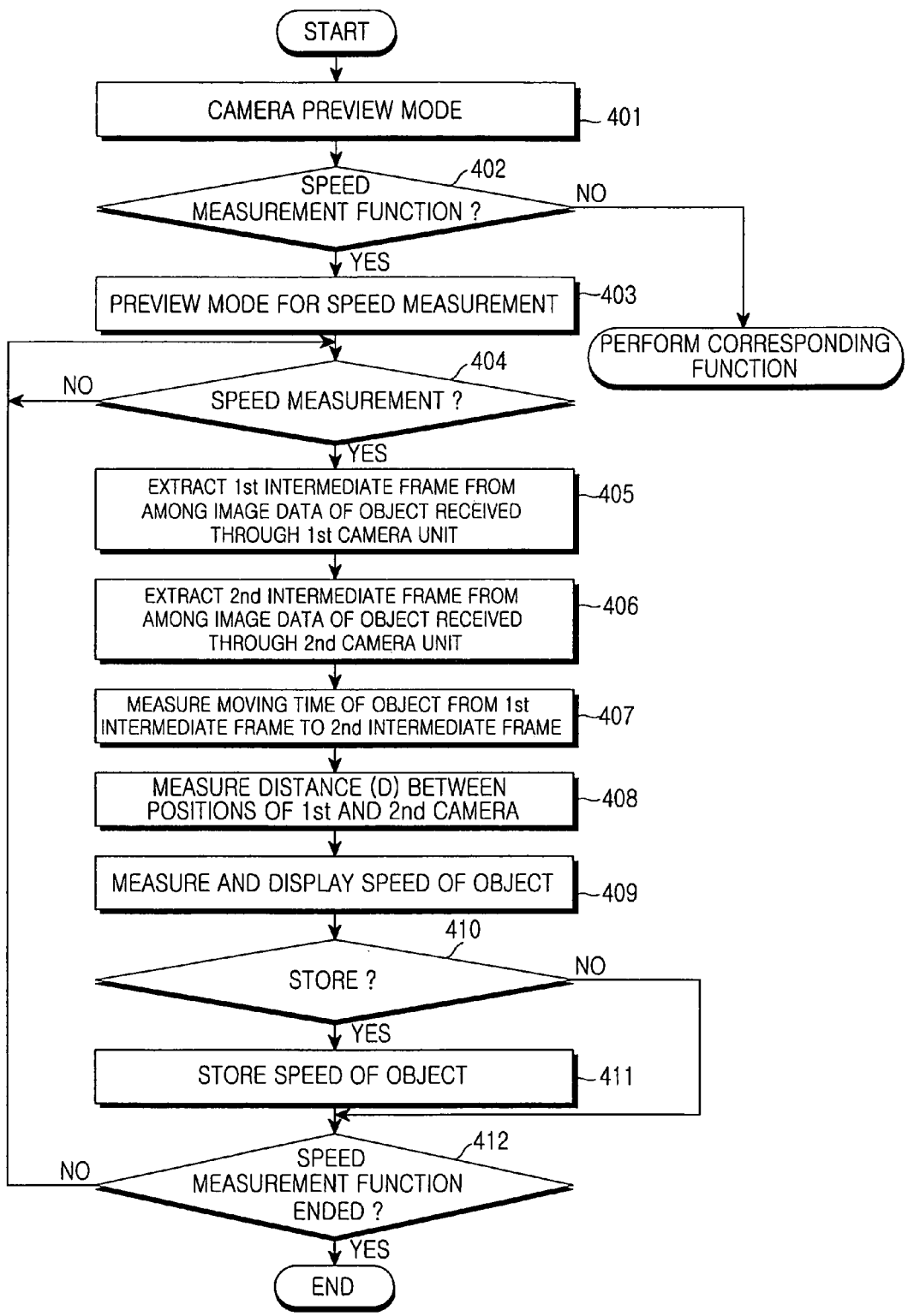
FIG. 4 is a flowchart illustrating an exemplary procedure of clocking the speed of a moving object by using a wireless terminal according to a second embodiment of the present invention.

FIG. 4 is a flowchart illustrating an exemplary procedure of clocking the speed of a moving object by using the wireless terminal according to a second embodiment of the present invention. The second embodiment of the present invention will be described with respect to a procedure of clocking the speed of a moving object using the first and second camera units 141 and 142 and displaying the clocked speed.

In the following description, the second embodiment of the present invention will be described based on the construction of the exemplary wireless terminal shown in FIG. 1.

Referring to FIG. 4, when a camera's photographing mode is selected in the wireless terminal, the controller 110 senses it and proceeds to step 401, in which the wireless terminal enters a camera preview mode. In the camera preview mode, the wireless terminal receives image data from the camera unit 140 and displays the received image data. When a speed measurement function is selected in the camera preview mode, the controller 110 senses it in step 402 and proceeds to step 403 for switching the wireless terminal into a preview mode for speed measurement.

Also, the speed measurement function may be selected in a menu of the wireless terminal. In this case, similarly, the controller 110 senses it and may proceed to step 403 for switching the wireless terminal into the preview mode for speed measurement.

In the preview mode for speed measurement of step 403, the first camera unit 141 and the second camera unit 142 simultaneously photograph and display an image. In this case, the display unit 160 may display two separate windows in order to simultaneously display an image received from the first camera unit 141 and an image received from the second camera unit 142. The reception of image data through the first and second camera units 141 and 142 may be performed in the camera preview mode of step 401, or may be automatically or selectively performed in the preview mode for speed measurement of step 403.

When a speed measurement execution is selected in the preview mode for speed measurement in which image data is received simultaneously through the first and second camera units 141 and 142, the controller 110 senses it step 404 and proceeds to step 405 and step 406. In step 405, a first intermediate frame corresponding to the intermediate position of a moving object is extracted from image data received from the first camera unit 141. In step 406, a second intermediate frame corresponding to the intermediate position of a moving object is extracted from image data received from the second camera unit 142.

In step 405, when speed measurement execution is selected in the preview mode for speed measurement, the controller 110 performs a control operation such that a starting position of a moving object is extracted in the preview mode for speed measurement of the display unit 160 on which image data received through the first camera unit 141 is displayed. The controller 110 stores pixel values of image data frames received through the first camera unit 141 after the speed measurement execution is selected, while comparing pixel values of each currently-received image data frame with pixel values of a previously-received image data frame. When it is determined as a result of the comparison that a difference greater than a predetermined value is generated between the pixel values of a currently-received image data frame and the pixel values of a previously-received image data frame, the controller 110 determines that image data of an object, for which speed measurement is desired, is received and performs a control operation so that the currently-received image data frame is extracted as a start frame corresponding to a starting position of the moving object.

When the start frame corresponding to the starting position of the object is extracted, the controller 110 senses it and performs a control operation such that a final position of the moving object is extracted in the preview mode for speed measurement of the display unit 160. The controller 110 stores pixel values of image data frames received through the first camera unit 141 after the start frame is extracted, while comparing pixel values of each currently-received image data frame with pixel values of a previously-received image data frame. When it is determined as a result of the comparison that a difference greater than a predetermined value is generated between the pixel values of a currently-received image data frame and the pixel values of a previously-received image data frame, the controller 110 determines that image data of an object, for which speed measurement is desired, is no longer received and performs a control operation so that the received image data frame is extracted as a final frame corresponding to the final position of the object.

When the start frame corresponding to the starting position of the object and the final frame corresponding to the final position of the object are extracted, the controller 110 adds the frame number of the start frame to the frame number of the final frame and divides the sum by two, thereby extracting the frame number of a first intermediate frame corresponding to an intermediate position of the moving object.

In step 406, the frame number of a second intermediate frame corresponding to an intermediate position of the moving object may be extracted from image data received through the second camera unit 142 at the same time and in the same manner as described in regard to step 405.

When the first and second intermediate frames are extracted in steps 405 and 406, the controller 110 extracts a reception time of the first intermediate frame received from the first camera unit 141 and a reception time of the second intermediate frame received from the second camera unit 142. Then, the controller 110 proceeds to step 407 for obtaining a moving time period "T" of the object by calculating a difference between the reception time of the first intermediate frame and the reception time of the second intermediate frame.

The first camera unit 141 and the second camera unit 142 are fixedly installed in the wireless terminal. Therefore, the controller 110 can obtain a moving distance "D" of the object according to the distance between the positions at which the first and second camera units 141 and 142 have been installed in step 408.

After the moving time period "T" and the moving distance "D" of the object are calculated in steps 407 and 408, the controller 110 proceeds to step 409 in which the speed of the object is calculated according to Equation (3) repeated below, and the calculated speed is displayed.

$$\text{Speed} = \frac{\text{Moving Distance } (D)}{\text{Moving Time } (T)} \qquad (3)$$

When a storing function is selected in step 409 when displaying the calculated speed of the object, the controller 110 senses it in step 410 and proceeds to step 411 for storing the displayed speed of the object. When the speed measurement function is ended, the controller 110 senses it in step 412 and performs a control operation such that the preview mode for speed measurement is ended. When the preview mode for speed measurement is ended, the wireless terminal may be switched either into the camera preview mode of step 401 or into a waiting mode.

As described above, a wireless terminal according to embodiments of the present invention can measure and display the moving speed of an object in a camera preview mode, so that the user can easily measure the moving speed of an object by using only the wireless terminal, even without a separate device for speed measurement.

While embodiments of the present invention have been shown and described with reference to certain exemplary embodiments thereof, it will be understood by those skilled in the art that various changes in form and details may be made therein without departing from the spirit and scope of the invention as defined by the appended claims. Accordingly, the scope of the invention is not to be limited by the above embodiments but by the claims and the equivalents thereof.

What is claimed is:

1. A method for clocking a speed using a wireless terminal including a camera unit, the method comprising the steps of:

entering a preview mode for speed measurement when a speed measurement function is selected in a camera preview mode of the wireless terminal;

measuring a moving distance of an object in the preview mode for speed measurement;

measuring a moving time period of the object in the preview mode for speed measurement; and measuring and displaying a moving speed of the object by using the moving distance and moving time period of the object which have been measured.

2. The method as claimed in claim 1, wherein the moving distance of the object is obtained by the following Equation:

$$D = 2H \times \tan\frac{\theta}{2},$$

wherein θ represents an angle between a starting position and a final position, "D" represents the moving distance of the object, and "H" represents a distance between the camera unit and the object.

3. The method as claimed in claim 2, further comprising the step of obtaining the distance "H" between the camera unit and the object through the steps of:

extracting an intermediate position of the object being moved in the preview mode for speed measurement of the wireless terminal; and extracting the distance between the camera unit and the object.

4. The method as claimed in claim 3, wherein the step of extracting the intermediate position of the object comprises the steps of:

comparing a pixel value of an image data frame currently-received through the camera unit with a pixel value of a previously-received image data frame in the preview mode for speed measurement of the wireless terminal;

extracting the currently-received image data frame as a start frame corresponding to a starting position of the object when a difference between the pixel value of the currently-received image data frame and the pixel value of the previously-received image data frame is greater than a predetermined value;

comparing a pixel value of an image data frame, which is newly received through the camera unit after the start frame of the object has been extracted, with a pixel value of a previously-received image data frame;

extracting the newly-received image data frame as a final frame corresponding to a final position of the object when a difference between the pixel value of the newly-received image data frame and the pixel value of the previously-received image data frame is greater than a predetermined value; and extracting an intermediate frame corresponding to an intermediate position of the object based on the start frame and the final frame.

5. The method as claimed in claim 3, further comprising the step of:

extracting a distance between the camera unit and the intermediate position of the object by using an auto-focus function.

6. The method as claimed in claim 1, wherein the moving time period of the object is obtained by the following Equation:

T=(Final Frame−Start Frame)×Time Period Per Frame, wherein "T" represents the moving time period of the object, "Start Frame" represents a frame number of a start frame corresponding to a starting position of a moving object, "Final Frame" represents a frame number of a final frame corresponding to a final position of the moving object, and "Time Period Per Frame" represents a time period required for receiving one frame.

7. The method as claimed in claim 6, further comprising the step of obtaining the start frame and the final frame through the steps of:

comparing a pixel value of an image data frame currently-received through the camera unit with a pixel value of a previously-received image data frame in the preview mode for speed measurement of the wireless terminal;

extracting the currently-received image data frame as a start frame corresponding to a starting position of the object when a difference between the pixel value of the currently-received image data frame and the pixel value of the previously-received image data frame is greater than a predetermined value;

comparing a pixel value of an image data frame, which is newly received through the camera unit after the start frame of the object has been extracted, with a pixel value of a previously-received image data frame; and extracting the newly-received image data frame as a final frame corresponding to a final position of the object when a difference between the pixel value of the newly-received image data frame and the pixel value of the previously-received image data frame is greater than a predetermined value.

8. A method for clocking a speed using a wireless terminal including at least two camera units, the method comprising the steps of:

entering a preview mode for speed measurement when a speed measurement function is selected in a camera preview mode of the wireless terminal;

measuring a moving time period of the object by receiving image data of a moving object through the two camera units in the preview mode for speed measurement;

measuring a moving distance of the object through the two camera units in the preview mode for speed measurement; and measuring and displaying a moving speed of the object based on the moving distance and moving time period of the object which have been measured.

9. The method as claimed in claim 8, wherein the step of measuring the moving time period of the object comprises the steps of:

extracting a first intermediate frame corresponding to an intermediate position of the object from among image data frames of the object which are received through a first camera unit of the two camera units in the preview mode for speed measurement;

extracting a second intermediate frame corresponding to an intermediate position of the object from among image data frames of the object which are received through a second camera unit of the two camera units in the preview mode for speed measurement; and measuring the moving time period of the object based on a reception time of the first intermediate frame and a reception time of the second intermediate frame.

10. The method as claimed in claim 9, wherein the step of extracting the first intermediate frame comprises the steps of:

comparing a pixel value of an image data frame currently-received through the first camera unit with a pixel value of a previously-received image data frame in the preview mode for speed measurement;

extracting the currently-received image data frame as a start frame corresponding to a starting position of the object when a difference between the pixel value of the currently-received image data frame and the pixel value of the previously-received image data frame is greater than a predetermined value;

comparing a pixel value of an image data frame, which is newly received through the first camera unit after the start frame of the object has been extracted, with a pixel value of a previously-received image data frame;

extracting the newly-received image data frame as a final frame corresponding to a final position of the object when a difference between the pixel value of the newly-received image data frame and the pixel value of the previously-received image data frame is greater than a predetermined value; and extracting the first intermediate frame corresponding to an intermediate position of the object based on the start frame and the final frame.

11. The method as claimed in claim 9, wherein the step of extracting the second intermediate frame comprises the steps of:

comparing a pixel value of an image data frame currently-received through the second camera unit with a pixel value of a previously-received image data frame in the preview mode for speed measurement;

extracting the currently-received image data frame as a start frame corresponding to a starting position of the object when a difference between the pixel value of the currently-received image data frame and the pixel value of the previously-received image data frame is greater than a predetermined value;

comparing a pixel value of an image data frame, which is newly received through the second camera unit after the start frame of the object has been extracted, with a pixel value of a previously-received image data frame;

extracting the newly-received image data frame as a final frame corresponding to a final position of the object when a difference between the pixel value of the newly-received image data frame and the pixel value of the previously-received image data frame is greater than a predetermined value; and extracting the second intermediate frame corresponding to an intermediate position of the object based on the start frame and the final frame.

12. The method as claimed in claim 8, wherein the moving distance of the object is obtained according to a distance between the two camera units, which are fixedly-installed in the wireless terminal.

13. A system for clocking a speed using a wireless terminal, comprising:

at least one camera unit in communication with a controller;

a display unit in communication with the controller;

the controller, wherein the controller is configured to enter a preview mode for speed measurement when a speed measurement function is selected in a camera preview mode of the wireless terminal, the controller further configured to measure a moving distance of an object in the preview mode for speed measurement, measure a moving time period of the object in the preview mode for speed measurement, and measure and display a moving speed of the object by using the moving distance and moving time period of the object which have been measured.

14. The system as claimed in claim 13, wherein the controller is configured to determine the moving distance of the object by using the following Equation:

$$D = 2H \times \tan\frac{\theta}{2},$$

wherein $\theta$ represents an angle between a starting position and a final position, "D" represents the moving distance of the object, and "H" represents a distance between the camera unit and the object.

15. The system as claimed in claim 14, wherein the controller is configured to determine the distance "H" between the camera unit and the object by extracting an intermediate position of the object being moved in the preview mode for speed measurement of the wireless terminal, and extracting the distance between the camera unit and the object.

16. The system as claimed in claim 13, wherein the controller is configured to determine the moving time period of the object by the following Equation:

$$T = (\text{Final Frame} - \text{Start Frame}) \times \text{Time Period Per Frame},$$

wherein "T" represents the moving time period of the object, "Start Frame" represents a frame number of a start frame corresponding to a starting position of a moving object, "Final Frame" represents a frame number of a final frame corresponding to a final position of the moving object, and "Time Period Per Frame" represents a time period required for receiving one frame.

* * * * *